United States Patent [19]

Rogers et al.

[11] Patent Number: 5,656,217
[45] Date of Patent: Aug. 12, 1997

[54] PRESSURELESS SINTERING OF WHISKER REINFORCED ALUMINA COMPOSITES

[75] Inventors: William M. Rogers, Taylors; James F. Rhodes, Greer, both of S.C.

[73] Assignee: Advanced Composite Materials Corporation, Greer, S.C.

[21] Appl. No.: 305,137

[22] Filed: Sep. 13, 1994

[51] Int. Cl.⁶ .................................................. C04B 33/32
[52] U.S. Cl. ........................ 264/640; 264/666; 264/667
[58] Field of Search ........................................ 264/60, 65

[56] References Cited

U.S. PATENT DOCUMENTS

| | | | |
|---|---|---|---|
| 2,979,414 | 4/1961 | Ryshkewitch et al. | 106/44 |
| 3,562,371 | 2/1971 | Bush | 264/65 |
| 3,886,254 | 5/1975 | Tanaka et al. | 264/332 |
| 3,903,230 | 9/1975 | Kamigaito et al. | 264/122 |
| 4,010,233 | 3/1977 | Winter et al. | 264/63 |
| 4,071,371 | 1/1978 | Milberg et al. | 106/65 |
| 4,104,782 | 8/1978 | Veeck et al. | 29/527.2 |
| 4,108,652 | 8/1978 | Ogawa et al. | 75/223 |
| 4,152,223 | 5/1979 | Wallace et al. | 204/37 R |
| 4,184,884 | 1/1980 | Jong | 106/73.2 |
| 4,199,339 | 4/1980 | Grunke | 65/18 |
| 4,218,253 | 8/1980 | Dworak et al. | 106/43 |
| 4,230,745 | 10/1980 | Betz et al. | 427/255.4 |
| 4,242,294 | 12/1980 | Huther et al. | 264/62 |
| 4,250,610 | 2/1981 | Wilbers et al. | 29/424 |
| 4,280,973 | 7/1981 | Moskowitz et al. | 264/63 |
| 4,543,345 | 9/1985 | Wei | 501/95 |
| 4,652,413 | 3/1987 | Tiegs | 264/66 |
| 4,657,877 | 4/1987 | Becher et al. | 501/89 |
| 4,745,091 | 5/1988 | Landingham | 501/87 |
| 4,746,635 | 5/1988 | Inoue et al. | 501/89 |
| 4,774,209 | 9/1988 | Gadkaree et al. | 501/89 |
| 4,789,277 | 12/1988 | Rhodes et al. | |
| 4,820,663 | 4/1989 | Mehrotra et al. | |
| 4,839,316 | 6/1989 | Tiegs | |
| 4,946,808 | 8/1990 | Wei et al. | 501/95 |
| 4,956,316 | 9/1990 | Sawyer | |
| 4,961,757 | 10/1990 | Rhodes et al. | 51/309 |
| 5,009,822 | 4/1991 | Sacks et al. | 264/23 |
| 5,053,363 | 10/1991 | Brandt | 501/95 |
| 5,095,730 | 3/1992 | Lauder | |
| 5,207,958 | 5/1993 | Tiegs | |
| 5,389,586 | 2/1995 | Rogers et al. | 501/87 |

FOREIGN PATENT DOCUMENTS

| | | |
|---|---|---|
| 59-054677 | 3/1984 | Japan . |
| 60-005079 | 1/1985 | Japan . |
| 61-104036 | 5/1986 | Japan . |
| 63-112471 | 5/1988 | Japan . |
| 1179766 | 7/1989 | Japan . |

OTHER PUBLICATIONS

"Pressureless Sintering of Alumina Matrix Composites", ORNL Report TM 10705, pp. 89–94 (1988).

"Processing of Pressureless–Sintered SiC Whisker–Reinformed $Al_2O_3$ Composites", Barclay S.J., Fox J.R., Bowen, H.K., Materials Science, vol. 22, No. 12 (Dec. 1987).

"Pressureless Sintering of Sic–Whisker–Reinforced Composites", Sacks M.D., Lee W.H., and Rojas O.E., Ceram. Eng. Sci. Proc., 9[7–8], 745–754 (1988) (TAB 21).

"Suspension Processing of $AL_2O_3$–Sic/Whisker Composites", Sacks M.D., Lee W.H., and Rojas O.E., J.Am. Ceram. Soc., 71[5] 370–379 (1988) (TAB 22).

"Slip Casting of SiC Whisker–Reinforced $SI_3N_4$", Hoffman M.J., Nagel A., Greil P., Petzow G., J.Am. Ceram. So., 72[5] (1989).

"Temperature Dependence of Strengthening by Whisker–Reinforcement:SiC Whisker–Reinforced Alumina in Air", Becher P.F., Tiegs N., Adv. Ceram. Mat. 3 [2] (1988).

"Thermal Shock Behvaior of An Alumina–SiC Whisker Composite", Tiegs T.N., Becher, P.F., J. Am. Ceram. Soc., 70 [5] (1987).

"Hot Pressed SiC Whisker/$Si_3N_4$ Matrix Composites", Shalek P.D., Petrovic J.J., Hurley G., Gac F., Am. Ceram. Soc. Bull, 65 [2] (1986).

"SiC Whisker Reinforced $Si_3N_4$ Composites", Kandori T., Kobayashi S., Wada S. Kamigaito I., J. Mat. Sci. Ltrs. 6 [11] (1987).

"$S_3N_4$–SiC Composites", Buljan S.T., Baldoni J.G., Huckabee M.L., Am. Ceram. Soc., Bull., 66 [22] (1987).

"Ceramic Tools Improve Cutting Performance", Gruss W.W., Am. Ceram. Soc. Bull, 65 [6] (1988).

"Constrained Network Model For Predicting Densification Behavior of Composite Powders", Lange F.F., J. Mater. Res., 2 (2), Jan./Feb. 1987.

"Sintering of Whisker–Reinforced Ceramics and Glasses", Chun–Hway Hsueh, J. Am. Ceram. Soc., 71 [10] C–442–444 (1988).

"Alumina–Sic Whisker Composites", Tiegs T.N. and Becher P.F., Ceram. Eng. and Sci. Proc., Sep./Oct. 1182–1186, 1986.

"Sintered $AL_2O_3$–Sic–Whisker Composites", Tiegs T.N. and Becher P.F., Am. Ceram. Soc. Bull., 66 [2] 339–42 (1987).

"Pressureless Sintering of $AL_2O_3$–Sic–Whisker Composites", Young–Wook Kim, June–Gunn Lee, J. Mater. Sci., 26 (1991) 1316–1320.

*Primary Examiner*—Christopher A. Fiorilla
*Attorney, Agent, or Firm*—Banner & Witcoff, Ltd.

[57] ABSTRACT

A composite and pressureless sintering process for making whisker-reinforced alumina composites using a nitride modifier. The whiskers are milled to an aspect ratio of less than 10. Green preform bodies are surrounded by a carbonaceous material during the sintering process to prevent direct exposure of the body surface to the atmosphere within the sintering furnace during the sintering step.

6 Claims, No Drawings

PRESSURELESS SINTERING OF WHISKER REINFORCED ALUMINA COMPOSITES

FIELD OF THE INVENTION

The invention relates to a pressureless sintering process for forming whisker-reinforced alumina-based ceramic bodies having excellent physical properties.

BACKGROUND OF THE TECHNOLOGY

Whisker-reinforced alumina has found use in structural applications such as heat engines and turbine blades (see, U.S. Pat. No. 4,543,345) and in more severe applications such as cutting tools (see, U.S. Pat. Nos. 4,789,277 and 4,961,757). These composites can have up to about 40 vol. % whiskers using a processing technique known as "hot pressing" which produces composites having a density of at least greater than 98% of theoretical. A density of at least about 95% is needed for virtually all engineering applications of ceramics.

In the conventional processes for making whisker-reinforced alumina bodies, hot pressing can also be described as "pressurized sintering" because the process involves the application of uniaxial loads of about 3500–5500 psi. In the process, a powder blend or preformed sample is loaded in a free flowing form into a graphite die and sintered under a controlled atmosphere in a high temperature furnace. Pressure is applied to the powder in the die with a hydraulic ram as the furnace temperature is increased to about 1450°–1850° C. and maintained at temperature for an appropriate time. The furnace is then allowed to cool. Cycle times of several hours are used, and the process is limited to the production of discrete batches.

The structural limits of the dies generally prohibit the use of applied pressures greater than about 5500 psi. In addition, the hot pressing method generally limits the shape of the formed body to simple geometric shapes such as round or rectangular plates or cylinders unless special complex dies and pressure rams are constructed at great expense. In addition, the properties of such hot pressed bodies are more anisotropic due to the uniaxial loading than those prepared by the pressureless sintering.

Hot pressing is to be contrasted with "green" preform body preparation, "pressureless sintering" and "hot isostatic pressing" (HIPing). Green preform bodies are prepared by mixing ceramic powder blends with conventional sintering aids (e.g., magnesia and/or rare earth oxides) and an organic binder containing a lubricant. The green preform body is then formed by compacting the powder blend at ambient temperature to a density of about 60–70% of theoretical. The theoretical density of a material is generally measured tycnometrically (ASTM C329-75) or estimated using the accepted "Rule of Mixtures."

Generally, green bodies are formed as simple geometrical shapes (e.g., a tube, cylinder, or disk) and, if necessary, machined to the desired shape allowing for shrinkage which will occur during subsequent heating steps (i.e., near-net-shape fabrication). Binder material is removed by heating the shaped green body in air in an oven at temperatures up to 500° C. for about 10–15 hours depending on size and shape.

A green preform body is further densified by pressureless sintering in a furnace at 1250°–1850° C. under an atmosphere (e.g., argon or nitrogen) that does not adversely affect either the composite being sintered or the sintering furnace components. The sintering is allowed to continue until essentially complete (generally greater than 94% to 95% theoretical density). If the resulting sintered body forms a closed cell structure (closed porosity), the density may be further increased by hot isostatic pressing.

Hot isostatic pressing (HIPing) is the process of applying high pressure to a sintered body with inert gas typically at 15,000–30,000 psi for about 1–2 hours at a temperature of from about 1500° to about 1700° C. (for aluminum oxide) with the goal of producing a body having greater than about 98% theoretical density. The sintered body to be HIPed must exhibit an almost completely closed cell structure for HIPing to have a significant effect. The concentration of closed pore structure is calculated from the formula:

(% Closed)=100−(% Theoretical density)−(% Open Porosity)

The method used for measuring the closed porosity is ASTM C830-83. Briefly described, the open pore structure is determined by measuring water uptake during vacuum impregnation of the body. As an example, if a dry sintered body with a density of 95% theoretical density has a water uptake corresponding to 1% of the alumina composite density, then the body has a 4% closed pore structure. The theoretical density is calculated by applying the rule of mixtures to the absolute densities of each component phase, as is well known in the art.

Economically, hot pressing is an extremely expensive and labor intensive process. The pressing equipment is costly. The graphite dies must be cut from a unitary block and do not last for many pressings. The cycle times are relatively short, but can only produce a limited number of specimens. The pressed bodies are limited to simple geometric shapes. The machining of such shapes to final form is difficult due to the high density and hardness of the body and can lead to rejects or surface stresses that affect the structural performance of the part. See, Sacks U.S. Pat. No. 5,009,822.

By contrast, pressureless sintering is about 25–33% the cost of hot pressing. Conducting the process at about atmospheric pressure reduces the capital expense of the equipment needed for the process. Continuous processing can be used, and large numbers of parts can be made. If a batch process is used, the batches are larger and the furnaces can be used more economically. Metal dies used for green forming can be reused for many pieces. The ability to readily machine the green body permits the formation of complex shapes. If needed, HIPing can be used after pressureless sintering to increase the final density of the body at a total cost that is still less than the corresponding hot pressing process (i.e., perhaps 30% less) but without the inherent limits imposed by hot pressing.

Pressureless sintering would, therefore, be a preferred method for making ceramic bodies and for whisker reinforced ceramics in particular. Unfortunately, those in the art have found that pressureless sintering does not produce adequate densities when the composite contains more than 10 vol. % (about 8.1 wt %) whiskers. See, Tiegs U.S. Pat. No. 4,652,413 where an alumina matrix containing 2% yttria as a sintering aid and 10 vol % silicon carbide whiskers was sintered by pressureless sintering to greater than 94% theoretical, but an equivalent sample with 20 vol % (about 16.7 wt. %) whiskers could achieve only 75% theoretical density. This limitation of about 10 vol % whiskers is also described in Sacks U.S. Pat. No. 5,009,822 in col. 7, lines 4–12. Somewhat similarly, WO 86/05480 exemplified sintered densities of greater than about 95% theoretical only for composites containing up to about 12.1 volume % (10 wt %) whiskers (Table I).

A review of the problems associated with pressureless sintering of alumina-SiC whisker composites is presented in Tiegs et al., A. Ceram. Soc. Bull., 66(2) 339–342 (1977). As described on page 340, the whiskers interfere with efficient particle packing, particle rearrangement, and shrinkage. The result is a low final density. Table II and FIG. 2 in Tiegs show that as the whisker content increases, the green and final densities decrease. Tiegs et al. states: "At whisker contents much greater than 10 vol %, the inhibition of densification is acute." Moreover, HIPing was not able to increase the density of the body because "the material had not achieved closed porosity prior to HIPing." The fracture toughness for the 20 vol % whisker material was reported by Tiegs as not significantly higher than monolithic alumina.

In a later paper, Tiegs et al. achieved a 95% density with pressureless sintering of an alumina composite containing about 13 vol % (about 10.7 wt %) whiskers. Ceram Engr. and Sci. Proc., Sept.–Oct. 1986, pp. 1182–1186, FIG. 2. The paper also summarizes the need in the art: "Further development may make it possible to sinter and then HIP (without encapsulation) alumina with up to 20 vol. % SiC whiskers, but that is yet to be shown."

The art has gone to great lengths to find a process that would produce a whisker-reinforced alumina composite with a density of at least about 95% theoretical. Techniques used to increase density include dry processing of powders with pressureless sintering and HIPing (see, Tiegs et al., Ceram. Engr. and Sci. Proc., 13th Automotive Conf., pp. 1182–1186 (Sept.–Oct. 1986)) and wet processing with size classification to remove agglomerates followed by slip and centrifugal casting of well dispersed suspensions of alumina and whiskers (see, Sacks et al., J. Am. Ceram. Soc., 71(5) 370–379 (1988)). These wet processing methods are considered to produce superior green bodies compared to dry powder processing. See, Sacks et al. in Table III. Wet processing techniques can be used to produce green bodies having high densities with even 30 vol % whiskers because green body density is not significantly affected by whisker size and concentration. Compare Sacks et al., J. Am. Ceram. Soc., 71(5) 370–379 (1988) with Tiegs et al., Ceram Engr. and Sci. Proc., (Sept.–Oct. 1986) in FIG. 2. Upon sintering, however, the whiskers exert a controlling influence over the densities which can be attained by sintering green bodies made by either dry or wet processing.

Whisker size is usually discussed in terms of the "aspect ratio", a dimensionless ratio of whisker length to diameter. The generally accepted wisdom in the art is that an aspect ratio of at least 10 is required to reinforce ceramics. See, Milewski et al., Handbook of Reinforcements for Plastics, p. 216–217 (1987) and Tiegs et al. U.S. Pat. No. 5,207,958.

The need continues to exist for a pressureless sintering process that will permit the use of high levels of whiskers as reinforcing agents for alumina matrices and result in a sufficiently high density with a sufficient degree of pore closure to permit HIPing the body to further increase both the density and strength of the ceramic to the level required by the intended application.

One skilled in the art will recognize that the application and purpose for which the reinforced ceramic is to be used will dictate the minimum density and strength that is required. Different applications and end uses will require different minimum densities and strengths. For example, a metal cutting tool insert with 15 wt. % whiskers requires a density of greater than 98% theoretical. Depending on the composition of the ceramic, its application, and end use, HIPing after pressureless sintering may or may not be required. The identification of the requirements for each use is within the skill of the art.

The art has also suggested the use of high levels, e.g. greater than 8 wt %, of sintering aids to increase the composite density. See, Tiegs et al. U.S. Pat. No. 5,207,958. The resulting liquid phase may, however, affect the composite's high temperature properties. Sacks et al., Ceram. Engr. Soc. Proc., 9 [7–8], pp. 741–754 (1988). It would be desirable to have a process that could produce high densities without the need for high levels of sintering aids which adversely affect properties of the composite.

In addition to a high density and closed pores, the final composite should exhibit high levels of fracture toughness. One method for increasing the toughness of a reinforced alumina composite is described in Landingham U.S. Pat. No. 4,745,091. The disclosed method includes hot pressing an alumina composite containing reinforcing particles, magnesia (as a sintering aid), zirconia or hafnia (for toughness and shock resistance), and 0.1–15 wt % of a nitride modifier. Reaction hot pressing is preferred to avoid the need for a preliminary step to pre-react the powders so as to form a second nitride phase (identified as "SiAlOX") uniformly dispersed in the matrix. See, col. 3, lines 6–9; col. 4, lines 30–38; and FIG. 3. If the powders are pre-reacted, the patent discloses that cold pressing and sintering can be used. The examples illustrate the use of a total nitride modifier concentration of 9–30 wt % with hot pressing fabrication. The problem of achieving high compaction densities with high whisker concentrations is not disclosed, acknowledged, nor exemplified.

It would be desirable to provide a pressureless sintering process that could produce whisker-reinforced alumina composites exhibiting levels of toughness comparable in use to those of reinforced alumina composites made by hot pressing.

SUMMARY OF THE INVENTION

It is an object of the invention to provide a process for preparing whisker reinforced alumina composites by pressureless sintering whereby the sintered body exhibits a high density and sufficient closed pores to permit the body to be HIPed to a density of at least about 98% theoretical.

It is another object of the invention to provide a process for preparing whisker reinforced alumina composites by pressureless sintering whereby the sintered body exhibits a toughness comparable in practical use to those of reinforced alumina composites made by hot pressing.

These and other objects that will become apparent from the description herein.

In one aspect, the invention contemplates a process which comprises:

sintering at ambient pressures a preform body having a density within the range from about 60% to about 70% theoretical and made from a mixture comprising a matrix material consisting essentially of alumina and up to about 4% of sintering aids, from about 10 to about 25 wt % monocrystalline whiskers exhibiting an average aspect ratio of less than 10, and from about 2 to about 7.5 wt % of nitride modifier consisting essentially of silicon nitride or aluminum nitride or mixtures thereof, to provide a sintered ceramic composite which exhibits a density of at least about 94% of theoretical and a sufficiently high density and concentration of closed pores that will permit the body to attain a density of at least about 98% theoretical upon hot isostatic pressing.

The present invention provides a process for consistently producing dense, tough ceramic composites despite the conventional wisdom in the art using a significantly less expensive procedure than the conventional hot pressing process. The practice of the invention allows for ready control of the composition and properties of the final product.

DETAILED DESCRIPTION

Composites according to the invention are made of an alumina matrix containing a nitride modifier, sintering aids, and optional toughening and/or hardening agents. Dispersed whiskers having an aspect ratio within the range of about 3 to less than 10 reinforce the matrix despite their small size.

Alumina useful for the matrix material of the present invention is α-alumina having a high degree of purity. Preferably, the powdered alumina used in the process has an average particle size from about 0.5 μm to about 1 μm and represents at least about 60% of the total weight of the final composite. The matrix may also contain a sintering aid and any conventional toughening agents.

The matrix nitride modifier for the present invention consists essentially of powdered, fiber, or whisker forms of silicon nitride, aluminum nitride, or mixtures thereof. The preferred nitride modifier consists essentially of silicon nitride. The average particle size range for the nitride modifier or modifiers when used in powered form is within the same ranges as those for the alumina, preferably about 0.5 μm to about 1 μm.

The total nitride modifier content should lie within a range from about 1 wt % to about 7.5 wt % based on the total composite weight, preferably from about 2 to about 7.5 wt %. More preferably, the total nitride modifier is added in a concentration with a range of about 3.5 to about 6 wt %, and most preferably a nitride modifier content of about 4 to about 5.5 wt % when 15 wt % whiskers is used. The optimum nitride modified concentration for a particular whisker concentration is readily determined by one in this art with the exercise of no more than the existing skill level from the teachings herein.

Sintering aids for the matrix of the present invention are known in the art and are used in concentrations of up to about 4 wt %, preferably a total of only up to about 2 wt %, most preferably a total within 1–2 wt %. A sintering aid acts to increase the efficiency of the sintering process without materially affecting the reinforcing effects of the whiskers in the matrix. Preferred sintering aids include at least one sintering aid of, inter alia, magnesia, yttria, and other rare earth oxides. Nitride modifiers such as silicon nitride and aluminum nitride according to the present invention are generally not considered to be sintering aids. See, Landingham U.S. Pat. No. 4,745,091 in col. 2, lines 39–68.

The matrix may also contain up to about 25 wt % of toughening and/or hardening agents to affect the overall composite toughness and hardness, respectively. Toughening agents useful in the invention are those oxides generally known in the art and include zirconia and/or hafnia. Hardening agents, such as titanium carbide, can be used in quantities of up to about 10 wt %. The toughening and hardening agents are in the form of particles typically within the size range from about 0.5 to about 1 μm. Titanium carbide particles, however, may be somewhat larger.

Monocrystalline ceramic whiskers exhibiting an aspect ratio within the range of about 3 to less than 10, preferably a ratio within the range of about 5–9, and most preferably within the range from about 6–8 are thoroughly distributed throughout the matrix of the invention for reinforcement thereof. Monocrystalline ceramic whiskers useful as matrix reinforcement include alumina, titanium carbide, silicon carbide, titanium nitride, aluminum nitride, aluminum oxynitride, and mixtures thereof. Each of these whiskers are well known in the art.

Silicon carbide whiskers are the preferred whisker for the present invention and are thoroughly described in U.S. Pat. No. 4,961,757 which is herein incorporated by reference. Briefly described, silicon carbide whiskers are in the beta form of silicon carbide whisker and exhibit a monocrystalline structure. Such whiskers may be produced from rice hulls and have average diameters on the order of 0.6 μm and initial, unmilled aspect ratios on the order of 15–150. Strengths are about 1 million psi (70,000 kg/cm$^2$) with tensile modulii of about 60–100 million psi (4–7 million kg/cm$^2$).

Whiskers may be present in amounts within the range from about 10 wt % to about 25 wt %, preferably within the range from about 10 or about 15 to about 23 wt %, and most preferably within a range from about 10 to about 20 wt %. Particularly good results are seen when the composite contains about 10–18 wt % or 10–15 wt % whiskers.

Composites made according to the present invention are made by mixing the alumina, whiskers, and nitride modifier with mixing techniques that reduce the average aspect ratio of the whiskers to an average aspect ratio within the range from about 3 to less than 10, preferably an average aspect ratio of within about 5–9, and most preferably to an average aspect ratio of about 6–8. The reinforcing effects of such small whiskers is contrary to the generally accepted wisdom that a minimum aspect ratio of 10 is required to produce reinforcement of ceramics. See, Milewski et al., *Handbook of Reinforcements for Plastics*, pp. 216–217 (1987) and Tiegs et al. U.S. Pat. No. 5,207,958.

Ball milling with alumina or ceramic balls of a sufficient size, weight, and material for the milling batch to effect the desired size reduction is a preferred mixing method. The selection of specific conditions and media will vary with the particular mill and process but is within the existing skill level of the art from the milled whisker specifications set forth herein. One preferred milling method involves a combination of wet ball milling, drying the wet milled material to form a cake, and dry ball milling the cake. Binding and milling aids are added to the process where they can best be dispersed to obtain optimum use. For example, wet ball milling times may range from about 2 to about 24 hours, drying may be at temperatures within the range from about 70° C. to about 120° C., and dry ball milling times may range from about 2 to about 48 hours.

An insufficiently mixed, dried, or pulverized powder can adversely affect the final product. The dry ball milling step is conducted for a sufficient period so that the composite will lose no more than about 2.5% by weight, preferably no more than about 2% by weight, upon pressureless sintering. The amount of time for dry ball milling will vary depending on the nature and scale of the equipment and operating parameters. The choice of equipment and operating parameters is within the skill of the art from the whisker sizes described herein. A green preform body is made from the thoroughly mixed, unreacted, free-flowing powder after wet milling and dry ball milling by conventional wet or dry forming methods. Conventional organic binders and lubricants are employed in preparing the preform bodies. Suitable methods include axial pressing at ambient temperatures at pressures within the range from about 10,000 to about 30,000 psi (6900–21,000 N/cm$^2$) and preferably about 10,000 to about 20,000 psi (about 6900–14,000 N/cm$^2$), cold isostatic pressing, extrusion with high back pressures, injection molding, and casting with conventional slip or centrifugal techniques (see, e.g., Sacks U.S. Pat. No. 5,009,822).

The preform bodies exhibit a density within the range from about 60% to about 70% of theoretical maximum and are often made in simple geometric shapes such as cylinders, round or square disks, and tubes. If desired, these preform bodies may be machined by conventional techniques into a shape approximating that of the final product dimensions with appropriate allowance for shrinkage upon sintering. Such shapes are sometimes referred to in the art as having a "near net final" shape.

It should be noted that, contrary to the teaching in Landingham U.S. Pat. No. 4,745,091, the powders used for the matrix are not pre-reacted or otherwise subjected to chemical reaction processes before being shaped into green preform bodies. Although not wishing to be bound by any particular theory, the nitride modifier of the matrix in levels according to the invention appears to be mitigating the effects which previously inhibited the production of high composite densities with highly loaded whisker composites made by pressureless sintering. See, Lange, *J.Mater. Rsch.*, 2(1) 59–63 (1987) for a discussion of the factors which are thought to inhibit high loading. The matrix nitride modifier of the present invention may be producing a localized irreversible transient plastic or liquid phase during the sintering that permits further rearrangement of whiskers which are otherwise constrained from further movement by frictional forces in the absence of the nitride modifier. It is believed that pre-reaction of a nitride-containing matrix as taught by Landingham '091 forms a solid sialon-type phase during prereaction and would not form a transient liquid later under sintering conditions.

Pressureless sintering according to the invention is conducted on the preform composite bodies at about ambient pressures in a furnace, preferably a graphite furnace, at a temperature within the range from about 1500° to about 1850° C., and for a time sufficient to produce a sintered composite having a density of at least about 95%. A 98–99% theoretical density is generally a maximum density for pressureless sintering processes on whisker-reinforced composite bodies. Those skilled in the art of sintering will recognize that no more than routine optimization will be needed to select the optimum conditions for the specific geometries of the furnace and the shapes of the samples being sintered.

Ambient pressures for use in pressureless sintering include the atmospheric conditions prevailing at the manufacturing site although pressures somewhat above and below ambient pressures may be used if desired. Lower pressures may be used to evacuate the sintering chamber. Slightly elevated pressures (e.g., up to a few atmospheres) may also be used to prevent entry of materials or gases from outside the sintering chamber although such elevated pressures generally provide little, if any, benefit to the sintered product. Generally, the sintering cycle time will be about 12–48 hours although those in this art are aware that sintering cycle temperatures and times may be varied depending on the nature and size of the body being sintered.

An inert carrier gas like argon, helium, or any of the other noble gases may be used in the purge gas stream passed through the sintering chamber. It has been discovered, however, that hardness and toughness may be improved in the final composite by use of a nitrogenous gas in the purge gas stream which is passed through the sintering chamber during the pressureless sintering process.

Nitrogenous gases that can be used in the purge gas include nitrogen and other nitrogen-containing gases like ammonia that will produce nitrogen at sintering temperatures but which does not adversely affect either the composite being sintered or the sintering furnace components.

Further improvement in the sintered ceramic composite may be obtained if the purge gas which is passed through the sintering chamber also contains a gaseous or vaporized hydrocarbon. The hydrocarbon can be added to any of the purge gases suitable for use in this invention. Virtually any hydrocarbon that assumes a gaseous or vaporous form at sintering temperatures can be used as a getter agent in the purge gas stream for the present invention. At the ceramic sintering temperatures contemplated for the present invention (1500°–1850° C.), most hydrocarbon species introduced with the stream of inert gas into the sintering chamber will crack or dissociate into species reactive toward any reactive impurities issuing from the composite being sintered. A getter should not be used if the reactive form will have sufficient excess hydrogen to favor the formation of water which can have a corrosive effect on the whiskers as well as the components of the sintering furnace. The amount of hydrocarbon present in the purge gas is within the skill of the art but often will be from about 0.1% to about 10%, preferably about 0.5–5%, and most preferably about 1–3%.

Suitable hydrocarbon agents for use as getter agents in pressureless sintering include linear, branched, and cyclic alkanes (e.g., methane, ethane, propane, butane, isobutane, pentane, hexane, and cyclohexane); linear, branched, and cyclic alkenes (e.g., ethylene, propylene, butylene, butadiene); linear, branched, and cyclic alkynes (e.g., acetylene, propyne, butyne, and pentyne); and mono- or multi-ring aromatic hydrocarbons (e.g., benzene, toluene, and naphthalene). For ease of operation and convenient handling, alkanes having 2–10 carbon atoms and monoaromatic hydrocarbons are preferred.

Regardless of which specific purge gas or combination of gases is used, the purge gas generally flows through the sintering chamber at a rate within the range from about 0.03 to about 30 gas hourly space velocity (GHSV). Preferably, the purge gas has a space velocity of 1–5 GHSV. Preferably, the purge gas contains a combination of at least 20 volume percent of a nitrogenous gas and about 0.1–10 percent of a hydrocarbon.

While not wishing to be bound by any particular theory, it is thought that the hydrocarbon acts, at least in part, as a uniformly distributed getter that acts to remove any surface or localized species, such as oxygen, issuing from the composite or present within the furnace during the sintering process that are reactive to the whiskers dispersed throughout the matrix. The net effect is that the whisker is protected through the sintering process and is better able to reinforce the matrix in the final product. This protection mechanism also helps to understand why hot pressing in a graphite die will produce highly reinforced composites: the solid carbon pressing on the sample is sufficiently close to be able to contact and deactivate reactive species from the composite and the surroundings. Pressureless sintering in a larger graphite chamber or container will not exhibit the same level of protection because the carbon is too far away from the composite surface and too localized in its effects to afford a similar protection against reactive species.

Still further improvements in the quality of the sintered product can be seen when the green bodies are encompassed by, wrapped in, or otherwise surrounded by a carbonaceous material, such as carbonaceous fabrics or carbon powder, in a manner that protects the green body surface from direct exposure to the atmosphere within the sintering furnace. Preferably, the carbonaceous material is a carbonaceous felt fabric such as that commercially available from Fiber Materials, Inc., Biddeford, Me. as Grade CH.

In the absence of a protective carbonaceous covering, the exposed sintered body surfaces show surface degradation, such as pitting and, with silicon carbide reinforcement whiskers, white-gray areas distinct from the green color normally imparted to alumina by silicon carbide whiskers. These signs appear on both large and small parts, but are more pronounced on parts of greater than about 10 mm in thickness. When a sintered body exhibits such signs, the material cannot be further densified to greater than 98% of theoretical by HIPing without employing some form of encapsulation or cladding.

The composite resulting from the pressureless sintering process of the invention exhibits a closed pore structure content sufficient to permit further compaction by HIPing to a density of greater than about 98% theoretical. The factors which affect the sintered density and closed pore structure include the fineness of the powders, the amount of silicon nitride present with respect to whisker content, the degree of dry ball milling, the selection of purge gas (eg: nitrogen is beneficial for higher densities and closed pores) sintering rates and sintering temperature. The optimum balance of these factors is within the skill of the art.

Sintered composites according to the invention exhibit a fracture toughness of greater than about 5 MPa$\sqrt{m}$, and a flexural strength of greater than about 500 Mpa after HIPing to provide the properties suggestive of utility for a number of applications for the composites. Fracture toughness is measured according to G. R. Anstis et al., Gen. Am. Ceram. Soc., 64, p. 553 (1981) employing a 10 kg load, and flexural strength is measured according to ASTM C1161. These sintered composites even before HIPing have utility for applications which may not always require very high tensile strength. Such applications include, inter alia, nozzles, seals, certain bearings, and some tools for shaping soft metals (e.g., brass).

If the sintering process results in a body having a density of less than about 98%, the sintered preform body may be further compacted by hot isostatic pressing (HIPing) for a time sufficient to produce a compacted body having a density of greater than about 98%. It should be noted that the present invention provides a product from pressureless sintering that has a sufficiently high concentration of closed porosity that further densification by hot isostatic pressing can be accomplished without the use of an external cladding or encapsulation material around the part subjected to the hot isostatic pressing.

Any HIPing of the sintered composite body is conducted by employing standard prior art techniques. Such techniques employ an inert gas, often argon, at from about 15,000 to about 30,000 psi at a temperature of about 1500° to about 1700° C. for a time (eg: 1–2 hours) sufficient to provide the desired density of at least about 98%.

HIPed composites from the present process are useful for fabrication into a variety of elements subject to wear and/or impact where toughness and shock resistance are important characteristics and which have previously been served by ceramics made by hot pressing. Particular applications for the present HIPed composites include, inter alia, drill bits exhibiting cutting edges for graphite composites, plastics, woods, or metals; router bits exhibiting cutting edges for, inter alia, wood, fiberboard, metal, plastics, or laminated composites including graphite composites and wood laminates; cutting tools exhibiting a cutting edge for cutting metals; turbine blades; heat engine components such as engine blocks, pistons, and valves; punches and dies exhibiting surfaces and clearances appropriate for can manufacture or other metal shaping operations; nozzles; roller or ball bearings that may be formed as assemblies in a metal or ceramic race; extrusion dies; and seals, inter alia, pump seals for impellers. These products can generally be formed into a shape approximating near net final shape so that any further processing that is required is minor.

Drill and router bits made from ceramics using the present process exhibit shapes which are the same as those of conventional drill and router bits. These tools are useful for cutting wood, metals, and laminates such as graphite composites and wood laminates. In fact, use of the present ceramic tools for cutting graphite composites will perform like hot pressed ceramic bits which can cut hundreds of holes in graphite composites without delamination. See, Lauder U.S. Pat. No. 5,002,439.

When used for cutting tools, the cutting tools are replaceable inserts of the standard geometry employed in the cutting tool industry for applications including, inter alia, turning, facing, milling, boring, and similar operations. The inserts will exhibit a cutting edge having dimensions and angles appropriate for cutting metal according to the desired cutting technique. As an example, a preferred insert geometry for cutting nickel-based alloys would exhibit an axial rake of −5°, an end cutting edge angle of 15°, a radial rake of −5° with a radial relief of 5°, and a corner angle of 15° with a nose radius of 0.030 inches (0.762 mm). See, Rhodes U.S. Pat. Nos. 4,961,757 and 4,789,277 which are herein incorporated by reference. Indeed, use of the process permits inserts and tools to be manufactured to near net final shape without the need for machining larger blanks and the material waste associated therewith.

Can tools made from ceramics produced according to the present process (either before or after HIPing) exhibit a shape of forming wheels, punches and/or dies with smooth outer surfaces and close tolerances between associated dies and punch elements. The whisker reinforced alumina ceramics possess a number of unique advantages in their ability to produce smooth part surfaces for long periods of time without significant buildup of can material on the outer surface of the tool. See, Lauder U.S. Pat. No. 5,095,730.

The ceramic bodies made according to this invention both after pressureless sintering and after HIPing have a substantially random three dimensional orientation of whiskers so that resistance to fracture is substantially the same in all directions. This orientation is in contrast to the substantially two dimensional orientation (perpendicular to the axis of the ram) which is obtained in a hot pressed ceramic product.

EXAMPLES

The following examples are useful for describing the benefits of the present invention. In all examples, the alumina was a commercially available α-alumina powder with a density of 3.98±0.02 g/cm$^2$ with a purity of at least 99.97%. The surface area of the alumina was 10.5 m$^2$/g. The sintering aids were magnesia and yttria in levels of less than 4%.

The silicon nitride powder was a commercially available mixture of alpha (>90%) and beta (<10%) forms having a density of about 3.18 g/cm$^2$. The average particle size of the silicon nitride powder was 0.45 µm.

The monocrystalline whiskers used in the examples were silicon carbide whiskers produced from rice hulls. These whiskers before processing have average diameters of about 0.4 to about 0.6 µm and initial aspect ratios on the order of 15–150. The whiskers had a density of 3.21 g/cm$^3$.

Unless otherwise stated, all percentages are given in terms of weight percent based on total weight.

EXAMPLES 1–2

Example 1 is a silicon carbide whisker reinforced alumina matrix containing 18 volume percent silicon carbide whiskers that were initially dispersed by wet milling, dried, and than dry ball milled for 16 hours and pressureless sintered according to the invention. Example 2 uses the same matrix materials with 23.8 volume percent whiskers and the same milling sequence except that dry ball milling was conducted for about 20 hours. The average aspect ratio of whiskers in the milled powder was measured at 500× magnification by computerized image analysis of representative powder samples (shape factor set at 0.6, average whisker diameter= 0.5 μm).

Each material was formed into a green body preform in the shape of a bar, encompassed by a carbonaceous felt fabric, and sintered under the effects of a purge gas containing nitrogen and 1–3% propane. The toughness of the resulting sintered, HIPed material is comparable to the hot pressed sample using a higher level of whiskers having an aspect ratio of greater than 10. See, Table 1.

TABLE 1

| Example | Whisker Content (wt %) | Average Aspect Ratio | Toughness (MPa√m) |
|---|---|---|---|
| 1 | 15 | 8.0 | 6.0 |
| 2 | 20 | 6.0 | 6.0 |
| Hot pressed | >20 | >10 | 6.5 |

It will be understood that the examples presented herein are for illustration purposes and are not intended to act as limitations on the scope of the appended claims.

We claim:

1. A process for making a sintered composite body comprising:

sintering at ambient pressures with a purge gas containing a nitrogenous gas and a hydrocarbon a preform body having a density within the range from about 60% to about 70% of theoretical maximum and made from a mixture comprising: a matrix consisting essentially of alumina and up to about 4 wt % of sintering aids, about 10 to about 25 wt % of monocrystalline whiskers exhibiting an average aspect ratio within the range from about 3 to less than 10, and about 2 to about 7.5 wt % of nitride modifier consisting essentially of silicon nitride or aluminum nitride or mixtures thereof, to provide a sintered ceramic composite which exhibits a density of at least about 95% of theoretical and a sufficiently high density and concentration of closed pores to achieve a density of at least about 98% theoretical upon densification by hot isostatic pressing.

2. The process according to claim 1 wherein the sintering is conducted with the preform body surrounded by a carbonaceous material.

3. The process according to claim 1 wherein the sintering is conducted on a preform body containing monocrystalline whiskers exhibiting an average aspect ratio within the range from about 5–9.

4. The process according to claim 1 wherein the sintering is conducted on a preform body containing monocrystalline whiskers exhibiting an average aspect ratio within the range from about 6–8.

5. A process according to claim 1 further comprising, before the sintering step, the step of:

forming a preform body having a density within the range from about 60% to about 70% of theoretical by a process consisting essentially of thoroughly mixing said alumina, yttria and magnesia sintering aids, silicon nitride modifier, and silicon carbide whiskers exhibiting an average aspect ratio within the range from 6–8 to form a mixture that will lose less than about 2.5% by weight upon pressureless sintering.

6. A process for making a sintered composite body comprising:

sintering at ambient pressures in a sintering furnace a preform body surrounded by a carbonaceous material that protects the surface of said body from direct exposure to conditions within said sintering furnace, wherein said preform body has a density within the range from about 60% to about 70% of theoretical maximum and is made from a mixture comprising: a matrix consisting essentially of alumina and up to about 4 wt % of sintering aids, about 10 to about 25 wt % of monocrystalline whiskers, and about 2 to about 7.5 wt % of nitride modifier consisting essentially of silicon nitride or aluminum nitride or mixtures thereof, to provide a sintered ceramic composite which exhibits a density of at least about 95% of theoretical and a sufficiently high density and concentration of closed pores to achieve a density of at least about 98% theoretical upon densification by hot isostatic pressing.

* * * * *